US010816268B2

(12) United States Patent
Wedel

(10) Patent No.: US 10,816,268 B2
(45) Date of Patent: Oct. 27, 2020

(54) CEMENT CLINKER COOLER WITH RECIPROCATING PLANKS

(71) Applicant: Alite GmbH, Neustadt (DE)

(72) Inventor: Karl von Wedel, Neustadt (DE)

(73) Assignee: Alite GmbH, Neustadt (DE)

( * ) Notice: Subject to any disclaimer, the term of this patent is extended or adjusted under 35 U.S.C. 154(b) by 0 days.

(21) Appl. No.: 16/582,909

(22) Filed: Sep. 25, 2019

(65) Prior Publication Data

US 2020/0025447 A1    Jan. 23, 2020

Related U.S. Application Data

(63) Continuation of application No. PCT/EP2018/057618, filed on Mar. 26, 2018.

(30) Foreign Application Priority Data

Mar. 27, 2017    (EP) .................................... 17163011

(51) Int. Cl.
*F23H 7/08* (2006.01)
*F23H 7/14* (2006.01)
(Continued)

(52) U.S. Cl.
CPC ......... *F27D 15/022* (2013.01); *B65G 25/065* (2013.01)

(58) Field of Classification Search
CPC ... F23G 5/002; F23H 7/08; F23H 7/14; F23H 9/06; F23H 9/08; F23K 3/10
See application file for complete search history.

(56) References Cited

U.S. PATENT DOCUMENTS

| 1,354,346 | A | * | 9/1920 | Skelly | ........................ | F23K 3/10 110/283 |
| 1,435,948 | A | * | 11/1922 | Van Brunt | ................ | F23K 3/10 110/328 |

(Continued)

FOREIGN PATENT DOCUMENTS

| DK | 199901403 A | 4/2001 |
| EP | 1103762 A1 | 5/2001 |

(Continued)

OTHER PUBLICATIONS

PCT International Search Report and Written Opinion, PCT/EP2018/057618, dated Jun. 12, 2018, 12 pages.

(Continued)

*Primary Examiner* — Gregory A Wilson
(74) *Attorney, Agent, or Firm* — Yakov Sidorin; Quarles & Brady LLP

(57) ABSTRACT

A grate bar (for forming a plank of a conveyor grate for transporting bulk material) includes at least an up-facing surface for supporting bulk material, a down-facing surface for supporting the grate bar on at least one grate bar rest, front end and rear-end sides, first and second profiled narrow sides. The first and second profiled narrow sides are complementary to one another and form a moving gap therebetween if and/or when the first profiled narrow side of the chosen grate bar is positioned adjacent to the second profiled narrow side of a neighboring grate bar (that is identical to the chosen grate bar at least with respect to the profile of the second profiled narrow side). The grate bar can be easily replaced if a front edge between the up-facing surface and the front-end side has a front edge curvature, a rear edge between the up-facing surface and the rear-end side has a rear edge curvature and the rear edge curvature is complementary to the front edge curvature.

14 Claims, 13 Drawing Sheets

(51) Int. Cl.
*F27D 15/02* (2006.01)
*B65G 25/06* (2006.01)

(56) References Cited

U.S. PATENT DOCUMENTS

| | | | | |
|---|---|---|---|---|
| 4,494,469 | A | * | 1/1985 | da Silva Pinto .......... F23H 7/06 110/255 |
| 4,600,380 | A | * | 7/1986 | von Wedel ............ F27D 15/022 432/58 |
| 5,947,719 | A | * | 9/1999 | Heinemann ........... F27D 15/022 110/270 |
| 7,798,809 | B2 | * | 9/2010 | Mersmann ................ C04B 7/47 110/281 |
| 8,132,520 | B2 | * | 3/2012 | von Wedel .............. F26B 17/26 110/281 |
| 9,513,058 | B2 | * | 12/2016 | Hammerich .......... F27D 15/022 |
| 2004/0185408 | A1 | | 9/2004 | Staak et al. |
| 2004/0222068 | A1 | * | 11/2004 | Meyer ................. B65G 25/065 198/750.2 |
| 2008/0263888 | A1 | | 10/2008 | von Wedel |
| 2013/0260669 | A1 | | 10/2013 | Eloranta et al. |

FOREIGN PATENT DOCUMENTS

| | | |
|---|---|---|
| EP | 1475594 A1 | 11/2004 |
| EP | 2559961 A1 | 2/2013 |

OTHER PUBLICATIONS

Chapter 3.1.3.2 Symmetry, Handbook of Mathematics, Fifth Edition, Copyright Springer-Verlag Berlin Heidelberg 2007, pp. 132-134.

Chapter 3.3.4 Solids Bounded by Curved Surfaces, Handbook of Mathematics, Fifth Edition, Copyright Springer-Verlag Berlin Heidelberg 2007, pp. 154-158.

* cited by examiner

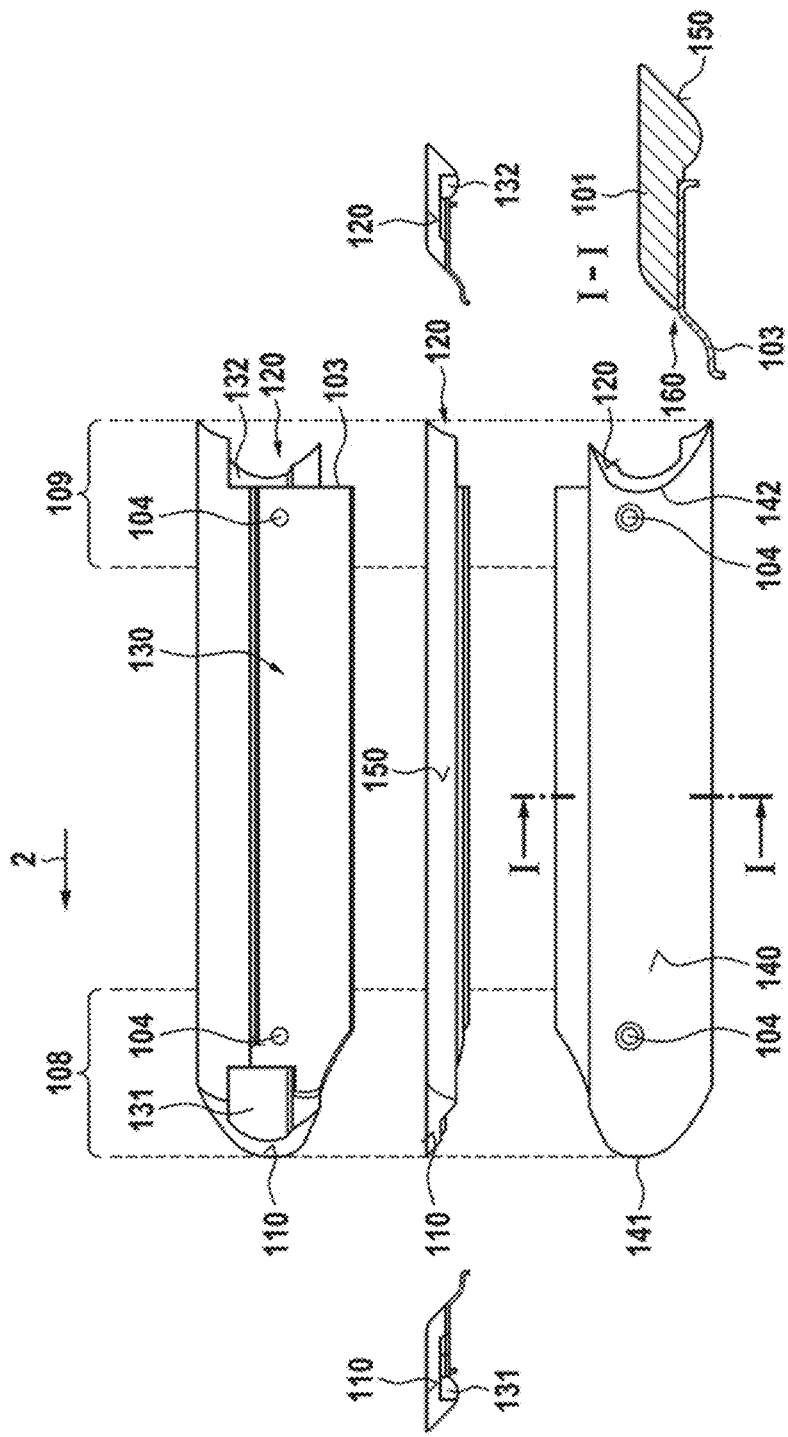
FIG. 3 (OVERVIEW)

CEMENT CLINKER COOLER WITH RECIPROCATING PLANKS

CROSS-REFERENCE TO RELATED APPLICATIONS

This application is a continuation of the pending International Application No. PCT/EP2018/057618 filed on 26 Mar. 2018, which designates the United States and claims priority from the European Application No. 17163011.4 filed on 27 Mar. 2017. The disclosure of each of the above-identified applications is incorporated by reference herein.

BACKGROUND

1. Field of the Invention

The invention relates to a grate bar for a conveyor grate floor of a cement clinker cooler and to a method for inserting or removing the grate bars into or from such grate floor.

2. Description of Relevant Art

In cement clinker manufacturing, the cement clinker, briefly clinker, is burnt and sintered in a rotary kiln. The clinker is unloaded from said kiln via a clinker distribution system onto a conveyor grate of a clinker cooler. On the conveyor grate the clinker forms a layer, as well referred to as clinker bed. The clinker bed is cooled and transported to a clinker outlet of the cooler, e.g. via a crusher for further processing, e.g. milling. The construction of the grate floor is essential as on the one hand cooling air or another coolant has to be inserted into the clinker via the grate floor and on the other hand clinker drop through the grate floor has to be avoided. In addition, the clinker has to be transported from the cooler's clinker inlet to the cooler's clinker outlet. Beyond the grate floor must withstand high clinker temperatures of typically about 1200° C. to 1450° C. and the abrasion caused by moving the clinker over the grate floor.

There are multiple types of clinker coolers, but for the moment it appears as if stepped grate coolers as disclosed e.g. in EP 2 559 961 A1 and coolers having planks extending in parallel to the conveying direction as disclosed e.g. in DE 10 2010 055 825A, U.S. Pat. No. 8,132,520 (as well published as US 2008/026388 A or DE 10 2007 019 530A) or EP 1 475 594 A1 are the two most relevant types. Here, we focus only on the second type of clinker cooler, as well referred to as "plank type" cooler. A plank type cooler typically has a multitude of planks, one besides of the other. The longitudinal orientation of the planks is parallel to the conveying direction and the planks are individually moved forward and backward, i.e. reciprocated parallel to the conveying direction to obtain a forward movement of the clinker bed residing on the up-facing surface of the planks. The clinker is loaded on a plane up-facing surface of the planks, extending parallel to the conveying direction. The cooling air is inserted via the moving gaps into the clinker bed, to thereby heat the cooling air and cool the clinker.

The conveyor grate as suggested in DE 10 2007 019 530 A1 consists of a multitude of planks, that are arranged in parallel one beside the other and oriented along the direction of transport. Between the planks are gaps that are defined by mutually facing narrow sides of adjacent planks; these gaps are hereafter referred to as moving gaps. The moving gaps enable to reciprocate the planks relative to each other and parallel to the direction of transport, thereby transporting the clinker by the known walking floor effect. The moving gaps have a siphon like cross section and cooling air is blown into the clinker bed on the conveyor grate via these gaps. The flow of air through the moving gaps is sufficient to keep the gaps open and to avoid particle drop into the moving gaps. Each plank consists of a multitude of consecutive grate bars and is attached the grate by a bolt which is accessible from below the grate floor.

DK 1999-01403 A discloses a conveyor grate for cooling and transporting of cement clinker. The conveyor grate consists of planks, that are arranged in parallel one next to the other. Between the planks are moving gaps but different from the teaching of DE 10 2007 019 530 A1 the moving gaps are sealed by a labyrinth sealing, to thereby avoid clinker particle drop below the grate floor. To sweep the labyrinth from intruded clinker, seal air is blown from below the planks through the labyrinth. However, for aeration of the clinker bed the planks have openings via which cooling air is injected into the clinker bed residing on the conveyor grate. Mounting of grate bars constituting the planks remains unaddressed.

The advantage of the conveyor grate as disclosed in DE 10 2007 019 530 A1 over the one disclosed in DK 1999-01403 A is that the moving gaps serve entirely for injection of the cooling air into the clinker bed and clinker drop is prevented as any further through holes are omitted, and as well as the complementary siphon shaped contour of the gaps provides an obstacle against the drop of clinker. In the absence of stationary aeration gaps all aeration gaps are moving and the entire cooling air serves cleaning of these gaps.

SUMMARY

The invention is based on the observation that the planks of a grate floor configured for cooling and conveying bulk material must be firmly attached to a supporting structure below the planks. This attachment should be reliable and releasable, permitting quick and easy replacement of defect or worn grate bars by a single person. The simplest possibility would be bolting the grate bars from below the grate floor to their respective rests; however, the space below the grate floor is rather packed by the supporting structure so that safe access and identification of defective grate bars from below is not possible and in some countries prohibited for safety arguments. The invention is further based on the observation that the grate bars and, respectively, the planks of the prior art are difficult to remove from the grate floor as the complementary (that is, spatially complementary) contours forming the moving gaps engage.

The object of the invention is to improve the known grate floors. Preferably, the grate bars constituting the planks should be manufactured by simple casting and should be replaceable working from the top of the grate floor. A single grate bar should be replaceable from a parquet like grate floor without removing neighbored grate bars.

Solutions to the problem are described in the independent claims. The dependent claims relate to further improvements of the invention.

The conveyor grate preferably comprises grate bars constituting a multitude of planks configured for supporting and conveying bulk material, e.g. said clinker. The longitudinal axis of each plank is parallel to the conveying direction. A plank can be formed by a number of grate bars which may be arranged one in front of the other. The planks are preferably arranged one besides of the other with moving gaps in between. The grate bars can be short with respect to the length of a plank. A typical plank has a length in the order of about 20 m (about 5 m to about 40 m). The grate bars can be much shorter, e.g., in order of one meter (0.2 to 2 m), e.g. 50 cm. This simplifies their manufacture by casting, installation and replacement of worn or otherwise defective grate bars, as they can be handled by a single person working from the grate's surface.

The grate bars and the planks are oriented along the direction of conveying and are positioned side by side. Thus, disregarding the boundaries of the grate floor, each plank has two side neighbor planks. In addition, the grate bars have a front neighbor grate bar and a rear neighbor grate bar.

The grate bars and thus the planks comprise at least an up-facing surface configured for supporting the bulk material, a down-facing surface (a bottom surface) configured for supporting each grate bar on at least one rest. Each grate bar has a front-end side, a rear-end side, a first profiled narrow side and a second profiled narrow side, where the first profiled narrow side is complementary (spatially complementary) to the second profiled narrow side configured for forming a moving gap there between if the first profiled narrow side of a (first) plank is positioned adjacent to the second profiled narrow side of a further (neighboring) grate bar or plank, the latter having a contour that is congruent to the first grate bar and/or plank at least with respect to the profile of the second profiled narrow side. In other words, two grate bars of the same shape can be arranged one beside of the other (as immediately neighboring grate bars), whereby a first profiled narrow side of a first of the two planks and a second profiled narrow side of a second of the two planks form a moving gap via which cooling air (which cooling air is used as synonym for and defines any gaseous coolant) can be injected into a layer of bulk material residing on the up-facing surfaces of the planks. Preferably, one of the profiled narrow sides of one grate bar overlaps the complementarily-profiled narrow side of the neighboring grate bar to thereby form a moving gap that is inclined towards the grate floor surface.

The up-facing side or surface of a grate bar is preferably planar.

Preferably, the edge between the up-facing surface and the front-end side of the grate bars has a front edge curvature, and the edge between the up-facing surface and the rear-end side may preferably have a rear edge curvature. The edges are briefly referred to as front and rear edge. The rear edge curvature is in a preferred embodiment complementary (spatial-profile wise) to the front edge curvature. Even more preferred, at least a section of the front edge is congruent to at least a section of the rear edge. The front and rear edge curvature may in an example embodiment resemble a section of an ellipse or a circle, the latter being—strictly speaking—a special case of an ellipse. "Curved" or "having a curvature" means any curvature greater than zero and smaller than infinity. Zero curvature represents a straight line and an "infinite curvature" represents an edge. Geometrically speaking, the curvature is a measure of how fast the unit tangent vector to the curve representing the respective edge rotates. As explained in more detail further below, the front-end side and the rear-end side are preferably inclined in the same direction against the vertical. The surfaces of the front and rear-end sides defined thereby enable to replace a grate bar and thus a plank that is mounted on one or more plank rests as part of a grate floor without removing neighbored grate bars or even planks. It is sufficient to lift an upper of the two narrow facing sides and at the same time translate the grate bar along its longitudinal axis; in other words a grate bar can be removed from a grate floor comprising a multitude of such grate bars by a movement which is a superposition of a translation parallel to the conveying direction and a rotation, e.g. a pivotal movement (and a translation in the upward direction). As apparent, the longitudinal axis of each grate bare is parallel to the longitudinal axis of the plank.

This movement can be performed easily, even by hand, at least if the grate bars are not too heavy, but cannot occur while bulk material, like clinker, is cooled and conveyed on a grate floor that is formed by said planks. Although said grate bars and thus the planks are preferably bolted to grate bar rests, briefly referred to as rests, they do not get lost if one of the bolts gets lost. This enables to simply use threaded bolts or the like for attaching the grate bars to the rests. To this end, the grate bars preferably have at least one through hole configured for receiving a threaded bolt. Preferably, the through hole has a top section with a bigger diameter than a lower section, to thereby enable to counterbore the bolt head below the plane defined by the up-facing surface. Preferably, the bolt head's up-facing surface is at least flush or preferably below the up-facing surface of the grate bar. Thereby, abrasion of the bolt head due to transport of the bulk material is reduced and the bolt can be opened from the top of the grate floor even after the grate floor has been in use.

Preferably, the front-end side and the rear-end side may be inclined to form two spatially complementary surfaces, which are curved according to the front edge curvature. Thereby, removal of a mounted grate bar is facilitated further. Additionally, one may place one grate bar in front of another in an abutting relationship, that is without leaving a gap to compensate elongation of the grate bars when being warmed, e.g. by hot clinker. Upon heat extension of the grate bars, the upper end of each grate bar may slide over the lower end of the neighbored lower grate bar. The ratio of translation and rotation of a movement for inserting or removing a grate bar into or from the grate floor is defined by the inclination, the front and rear end curvature and in some cases possibly by the profile(s) of the profiled narrow sides, which are preferably overlapping and curved. The front edge curvature, the rear edge curvature and inclination of the front and rear surfaces are thus configured to permit said translation parallel to the conveying direction and said rotation.

In a preferred embodiment (i.e. alternatively or additionally to the above-specified solution), the preferably inclined front side and/or rear side may (each) comprise/s a (preferably circular) cylinder segment surface (that is, a segment of a cylinder surface; for the definition of a cylinder surface known in the art see: Handbook of Mathematics, Bronshtein/Semendyayev, $5^{th}$ Ed., Ch. 3.3.4, Springer, Heidelberg, 2007, which definition is incorporated herein by reference).

Preferably, the generating lines of the cylinder surfaces are inclined against the horizontal and as well against the vertical, where it is assumed that the grate surface is parallel to the horizontal plane (although it may in practice be inclined against the true horizontal). The generating lines of the cylinder surfaces are preferably (as well) inclined relative to a vertical plane including the conveying direction and/or the longitudinal axis of the grate bar. For simplicity, herein it is assumed that the conveying direction and the longitudinal axis of the grate bars are parallel, which is preferred relative orientation of the conveying direction and the longitudinal axis of the grate bars, but not the only possible. In practice, they are preferably at least approximately parallel, e.g. parallel within ±15°.

Preferably, the cylinder surfaces of the front side and of the rear side have at least essentially congruent directing curves (for the definition of congruent mapping known in the art see: Handbook of Mathematics, Bronstein/Semendyayev, $5^{th}$ Ed., Ch. 3.1.3.2, Springer, Heidelberg, 2007. This definition is incorporated by reference herein). In case of circular cylinder surfaces (i.e. those in which the cylinder's directing curve is a circle), the cylinder surfaces preferably have a common radius (within ±10%). The generating lines of the cylinder surfaces of the front side and of the rear side of the grate bar are preferably at least essentially parallel to each other (within 101. Thus, a translation along the longitudinal direction of the grate bar is sufficient to map the cylinder segment surfaces of the rear and front surfaces onto each other. Here, "mapping onto each other" does not necessarily mean that the front and rear sides are congruent, but that each of these sides includes a surface section that is congruent to a corresponding section of the other of these sides. The term "sufficient to map" means that only such single specified translation along the longitudinal axis of the grate bar is required to map the two surfaces on to each other. (It always is possible, of course, to combine other transformations to map the two surfaces, but at the end the combination of other transformations can simply be replaced by the specified single translation.)

Each of these optional specifications of the front and rear side enhances to enable an almost effortless removal and insertion of a grate bar from or into a grate floor by a movement that is a superposition of a rotation and a translation along the generating lines, while providing a positive locking for any other movement. Thus, even if a bolt intended for fixing the grate bar in its position gets lost during operation of the clinker cooler, the grate bar remains in its intended position until the bolt can be replaced during the next regular revision.

Preferably, one of the profiled narrow sides of the grate bars has an up-facing section that is inclined against (with respect to) the vertical towards the up-facing side. The transition between the up-facing section of the profiled narrow side and the up-facing side is preferably continuously curved, i.e. curved without an edge. The other profiled narrow side preferably has a down-facing section facing towards an up-facing section of an adjacent plank. Thereby, a moving gap of at least substantially constant (±20%, preferably ±10% or better) width can be obtained. This moving gap thus has an at least substantially constant (±20%, preferably ±10% or lower) cross section and is preferably continuously curved, i.e. does not have any abrupt "edge like" change. Thereby, the flow resistance of the cooling air can be reduced, i.e. only a low pressure drop occurs when guiding the cooling air through the moving gap thereby reducing the energy consumption for ventilation. In addition, the gas flow leaving the moving gap so to speak "attaches" to the up-facing surface of the plank, flowing perpendicular to the conveying direction along the up-facing surface. The air attachment to the up-facing surface of the plank simulates an infinite number of air openings for the passage of air through all void channels within the clinker bed.

Preferably, at least one baffle plate is attached to the plank and more preferably at least one baffle plate is attached to each or at least one grate bar. The baffle plate preferably extends (spatially continues) the lower end of an up-facing section of the respective profiled narrow side. In this case, at least a portion of the baffle plate may be attached to at least one grate bar while another section of the baffle plate extends over the lower end of the up-facing surface of the grate bar (or plank) to continue the contour of the lower end of the up-facing surface of the grate bar (or plank). The section of the baffle plate continuing the contour of the up-facing surface of the grate bar (or plank) preferably has a concave up-facing surface. The baffle plate is preferably mounted to the down-facing side of the plank or more preferably to each grate bar. When the grate bar or plank with a baffle plate is cooperated with other planks and/or grate bars to form a grate floor, at least one baffle plate preferably extends below the moving gap (that is formed by neighboring the grate bars, assuming these neighboring grate bars not have a baffle plate) thereby preventing clinker from falling through.

While the grate bar itself must be of a hard metal like cast steel, to withstand the heat and abrasion of the clinker, the baffle plate may be of a different, cheaper material that is easier to process, e.g. sheet metal, because the baffle plate resides on the cold lower end of the plank. The baffle plate prevents particle drop through the planks. In other words, one may say that the grate bar and thus the respective plank has an upper part that is of e.g. cast metal to withstand the heat and abrasion of clinker and a lower part, that is of a second material. The second material is preferably cheaper and easier to process, e.g. sheet metal.

The planks may be mounted by mounting the grate bar to grate bar rests, as well briefly referred to as rests. The rests may be attached to at least one spreader. Preferably, each rest supports a front section of a first grate bar and an end section of a second, consecutive grate bar (of course except the rests at front or rear boundaries of the grate floor). Thereby, the number of parts and the time for assembly of the grate floor can be reduced. In addition, consecutive grate bars, forming a plank can be connected in a form fitting manner (by positive locking); in other words, a force that is exerted on one grate bar of a plank can be transferred to a second neighbored grate bar of the same plank. The grate bars thus span like a bridge from one rest to the next rest in longitudinal direction over a supporting construction below the planks.

A plank comprises a number of grate bars, which are arranged in a column one after the other along the direction of transport, which is parallel to the plank's longitudinal direction. At least some of the planks are reciprocated parallel to the direction of transport by a drive. Preferably, at least some planks are grouped to reciprocate together, i.e. the movement of the planks of a group has a common wave form, with the same phase and amplitude for all planks of a group.

For example, the grate floor may have three groups of planks referred to as group A, group B and group C, respectively. The planks of group C may be fixed, i.e. they are not reciprocated (=zero amplitude). The groups are preferably arranged one next to the other, e.g. like A,B,C, A,B,C,A,B,C. Thereby, conveying can be obtained by moving the planks of groups A and B forward together and subsequently retracting the planks of the groups one after the other. For example, one may retract first the planks of group A and subsequently the planks of group B, alternatively one may first retract the planks of group B and subsequently the planks of group A. The conveying effect can be enhanced, if at least one group of reciprocating planks is retracted faster than moved forward.

In a preferred embodiment, the planks of a fixed group are mounted next to the left and/or right boundary of the grate floor. Thereby, any (unwanted) moving side gaps between grate floor and fixed side walls can be eliminated. For example, if the planks of group C do not reciprocate, the pattern of groups could read |C,A,B,C,A,B, . . . ,A,B,C|, where "|" symbolizes the left and right fixed boundaries of the grate floor. The commas may symbolize moving gaps enabling a flow of the coolant from below the grate floor into the bulk material residing on it.

The grouping has been explained with respect to the planks but is valid accordingly for the respective grate bars. In other words, a plank of a particular group comprises grate bars of the same group.

The boundary of the grate floor is typically some wall like structure, e.g. of metal that is clad by refractory material. In case the planks of a fixed, non-reciprocating group are mounted next to the left- and/or right-side walls, an unwanted moving gap between the grate floor and the side wall will be eliminated.

Preferably, at least one of the rests has at least one protrusion engaging in a spatially complementary recess of at least one grate bar. The engagement of the protrusion into the recess reduces the shearing forces exerted to fastening means like said bolts. In addition, the positions of the grate bars on the rest can be well defined and thereby positions of the grate bars and planks relative to each other can be defined. Mounting of the planks is simplified accordingly.

The recess may have an open frontal and/or an open rear-end side, this reduces tensile stress due to thermal elongation (including contraction) of the grate bar and further enhances replacing a grate bar.

In a preferred embodiment, the grate bars have two recesses. One of the recesses may be at the bottom side of a front section of the grate bar configured for engaging with a protrusion of a rest upon which the grate bar is mounted. The other recess may be at the bottom side of a rear section of the grate bar configured for engaging with a further protrusion of a further rest, upon which the grate bar is mounted. One first of the recesses may precisely engage with the corresponding protrusion, to thereby provide an exact relative positioning of the grate bar to the respective rest. A second of said recesses may provide play enabling the corresponding protrusion to translate at least slightly at least along the longitudinal direction of the plank to thereby compensate for thermal elongation. Thereby, the grate bar may expand when heated (or contract when cooled down) without (over) stressing the rests and their supporting construction.

The front-end side and the rear-end side of two consecutive grate bars preferably form-fittingly abut each other, thereby closing an eventual gap and a particle tight butt joint can be obtained. It is thus avoided that bulk material drops below the planks. In operation the planks may be heated up to temperatures of about 500° C. or even higher and thus expand accordingly. If the front and rear-facing sides are preferably inclined as explained above, the upper of these sides may climb above the lower one.

Preferably, consecutive grate bars of a plank may be fixed by one or more bolts, which upon tightening may brace a threaded keystone into a form fitting position inside at least one of the grate bars, thereby interlocking the grate bars with each other. Said keystone is preferably movable parallel to the longitudinal direction of the grate bars forming a plank, thereby enabling heat expansion of the respective plank without buckling or at least with reduced buckling. At this point it is noted that buckling due to thermal expansion may result in abutting narrow facing sides of neighbored planks. This abutment causes wear, augments the energy for reciprocating the planks and renders cooling inhomogeneous.

Between consecutive grate bars of a plank may be a butt joint. Preferably the front-end side of a first (rear) grate bar abuts the rear-end side of a second (front) grate bar, to thereby eliminate clinker drop through the butt joint.

The grate floor preferably includes a supporting construction comprising at least a number of parallel longitudinal beams, at least some of which are driven to reciprocate parallel to the direction of transport. Preferably the longitudinal beams are grouped, where the longitudinal beams of a group are driven to reciprocate with a common wave form, in phase and with common amplitude. Thus, each group can be driven by a single actuator. At least two longitudinal beams of a group can be driven, i.e. reciprocated, by a single actuator. Between two longitudinal beams of a first group there is preferably at least one longitudinal beam of at least one different group. For example, between two longitudinal beams belonging to a "group A", could be e.g. two further longitudinal beams, one of which belongs to a group B and the other to a group C, as explained above with respect to the groups of planks. This allows driving the planks of a group, e.g. the planks of group A and/or B by reciprocating the longitudinal beams of group A and/or B, respectively.

The longitudinal beams of one of the groups may be fixed (e.g. group C), in other words they do not reciprocate with respect to a base (zero amplitude). This reduces the cost without significantly reducing the conveying efficiency.

Preferably, the longitudinal beams of a group are connected by at least one spreader that may be mounted for example on top of at least two longitudinal beams of the respective group. The spreader may span, e.g. like a bridge, over (or below) longitudinal beams of other groups. Preferably, the spreaders support and/or include at least one rest configured for attaching grate bars and thus planks upon. For example, each spreader may support two or more rests. This enables to mount at a corresponding number of grate bars and thus planks on each spreader. This constructional principle has a number of advantages as the number of longitudinal beams is effectively independent from the number of planks as this depends only on the number of rests of the spreaders.

The spreaders allow to enhance the number of planks without enhancing the number of longitudinal beams. In other words, keeping the width of the grate floor constant, the planks can be narrowed. As the number of planks is enhanced, the number of moving gaps is enhanced as well, and as the aeration of the clinker bed on the grate floor is provided through the moving gaps, air distribution is more homogeneous, i.e. there is an enhanced coolant to clinker contact providing more rapid heat exchange. The grate surface can thus be reduced yielding significant savings.

Surprisingly, more and narrower planks enhance clinker transportation. A possible explanation is that the chevrons of dead clinker resting on the planks are tinier, which becomes visible after cooler cleanout by a certain number of transport reciprocations. Logically, there exists less shearing surface and hence friction force between so called 'dead clinkers', which would reduce transport efficiency by unwanted transports in a wrong direction when retracting a plank.

In the context of this disclosure and for the purposes of the appended claims, the front end of the planks directs in the conveying direction, i.e. regarding a clinker cooler the front ends of the clinker cooler's planks direct towards the clinker outlet of the cooler (assuming as usual a straight cooler). The term "clinker" has been used to explain the operation of the grate floor; however, the invention is not limited to grate floors configured for cooling and conveying clinker, but to a grate floor for any bulk material.

BRIEF DESCRIPTION OF THE DRAWINGS

In the following, the invention is described without limitation of the general inventive concept based on examples of embodiments and with reference to the drawings, of which:

FIG. 1b shows a Detail X indicated in FIG. 1a.

FIG. 3 (Overview) provides additional information about the grate bar.

Figure 1A:
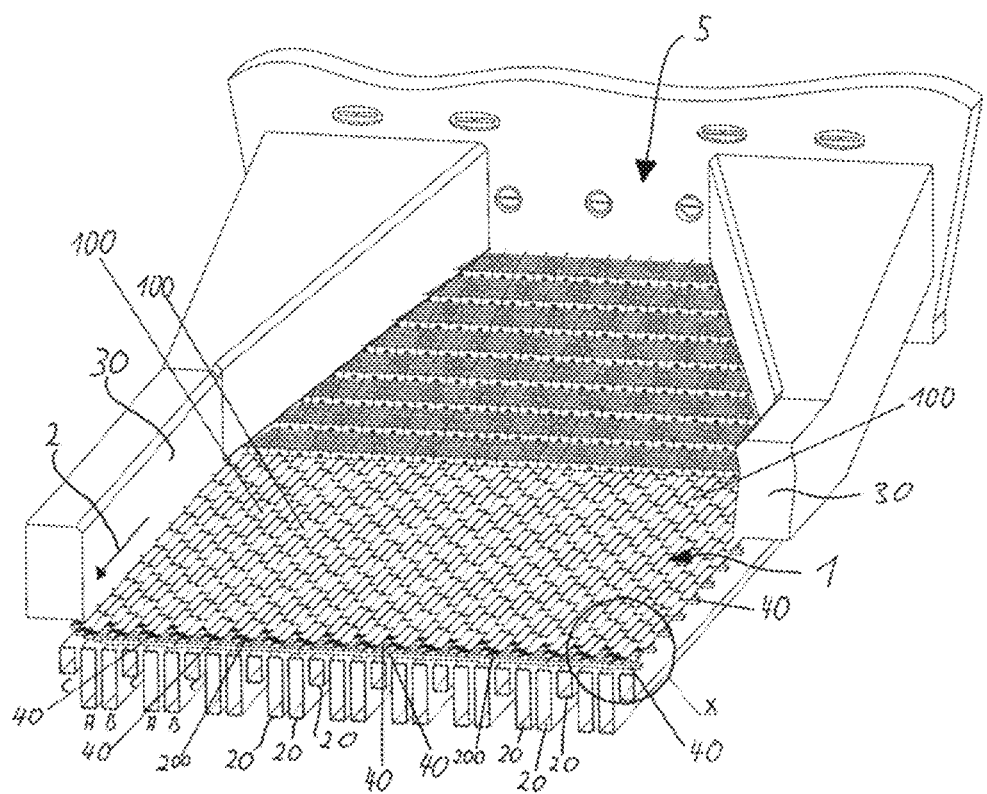
FIG. 1a is isometric view of a partially mounted grate floor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1B:
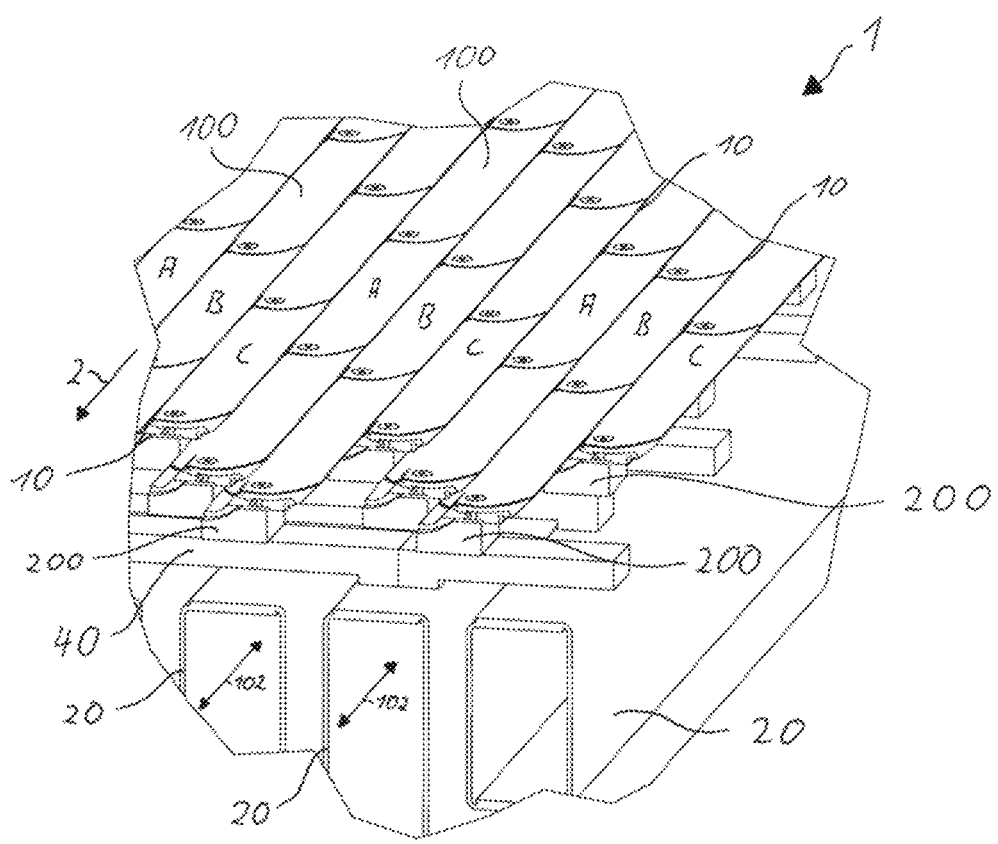

In FIGS. 1a and 1b a grate floor 1 is sketched. The grate floor 1 may be configured for and used for, e.g. cooling and conveying clinker. The conveying direction is symbolized by an arrow 2. The grate floor 1 has planks assembled of grate bars 100 which are mounted in columns one after the other. The front-end sides 110 of the grate bars 100 abut the rear-end sides 120 of subsequent grate bars 100 (cf. FIG. 3B), except the front-end sides 110 of the grate bars 100 that form the very front end of the grate floor 1 (not shown). The grate bars 100 and thus the planks have a longitudinal direction (defined to be parallel to the conveying direction and the arrow 2).

Figure 2:
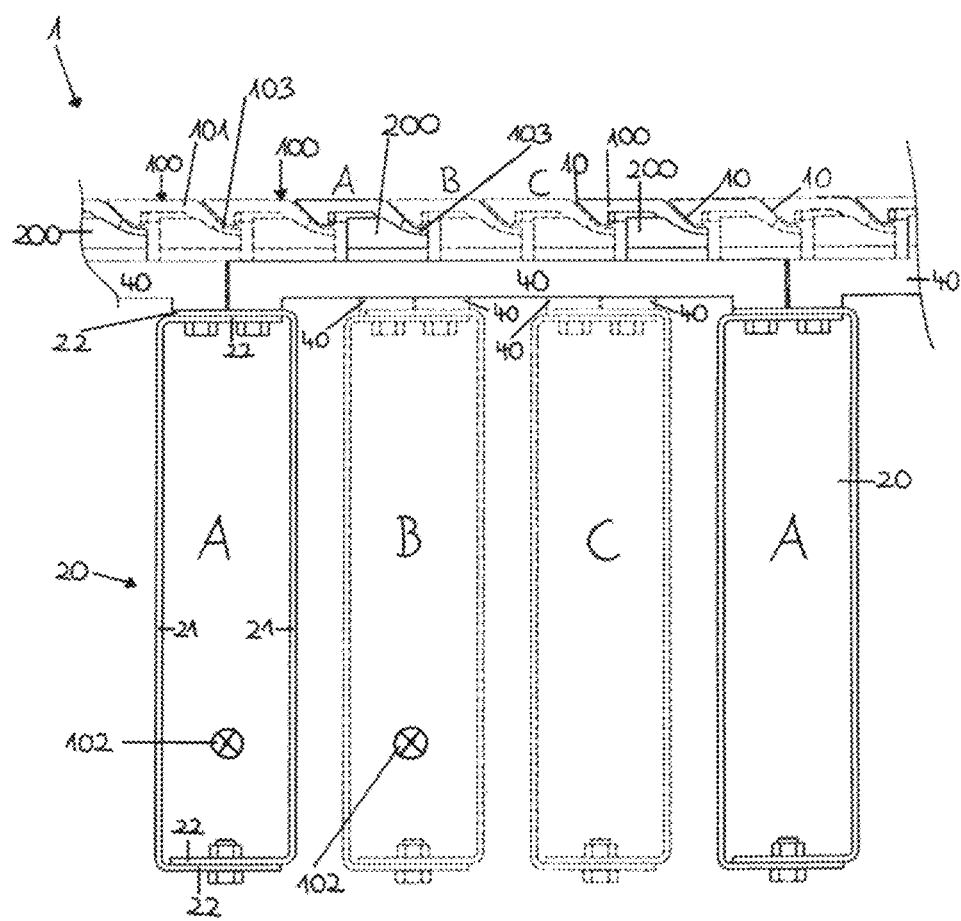
FIG. 2 shows a simplified sketch of a cross section of the grate floor.

As shown in a cross-sectional view of FIG. 2, between the planks there are moving gaps 10 that are configured to enable a reciprocating movement of the grate bars 100 of a given plank relative to the grate bars 100 of neighbouring planks along the longitudinal direction 2 of the grate floor, as indicated by double headed arrows 102. To the left and to the right of the planks are grate boundaries or side walls 30, which are clad with some refractory material (FIG. 1A). The grate bars 100 next to the boundaries 30 are preferably fixed relative to the cooler side wall 30. In other words, the planks next to the side wall 30 preferably do not reciprocate, in operation of the grate floor.

FIG. 2 shows a detail of a sketch of the grate floor 1, from which the supporting construction of the grate floor 1 becomes apparent. The grate floor 1 has longitudinal beams 20 that are supported by some bearing permitting a reciprocating movement along the direction 102 indicated in FIGS. 1a, 1b. The bearing can be, for example, a pendulum suspension as disclosed in U.S. Pat. No. 6,745,893, the disclosure of which is incorporated herein by reference. The longitudinal beams 20 may be formed as depicted by two opposed U-shaped profiles 21. In the example the free end legs 22 of one profile 21 are connected to overlap the corresponding free end legs 22 of the opposed profile 21, thereby forming a longitudinal beam 20 with a box like cross section. The longitudinal beams 20 are grouped, as indicated by capital letters A, B and C. The longitudinal beams 20 of group C are fixed and thus can be mounted statically to a base. The longitudinal beams of groups A and B are suspended and driven by actuators to reciprocate, where longitudinal beams of group A can reciprocate independently from the longitudinal beams of group B (and vice versa). Preferably, at least the longitudinal beams of groups A and B may each be supported via cross beams to the bearing, such as the pendulum suspension.

The longitudinal beams 20 of each group A, B, C are connected by spreaders 40, which thus as well can be grouped according to their movement. On top of each spreader 40 there are plank rests 200 (or rests 200, for short), to which grate bars 100 are mounted. Thereby, the rests 200 and grate bars 100 can be grouped accordingly, as well. By driving one group of the longitudinal beams 20 one as well drives the grate bars 100 of the corresponding group (cf. FIG. 1b).

Figure 3A:
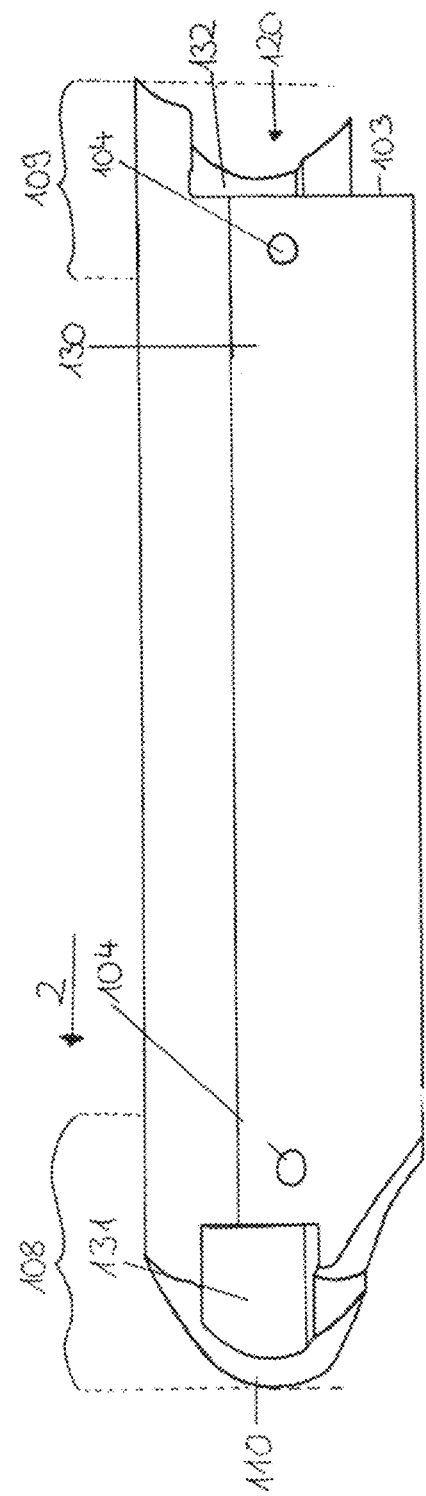
FIGS. 3a, 3b, 3c, 3d, 3e, and 3f show a grate bar of the grate floor.
Figure 3B:
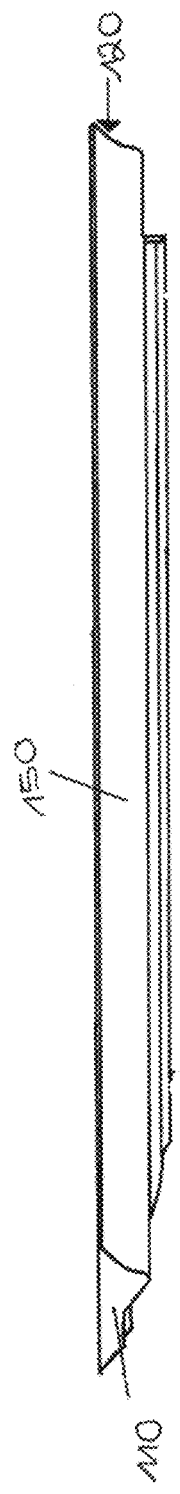
Figure 3C:
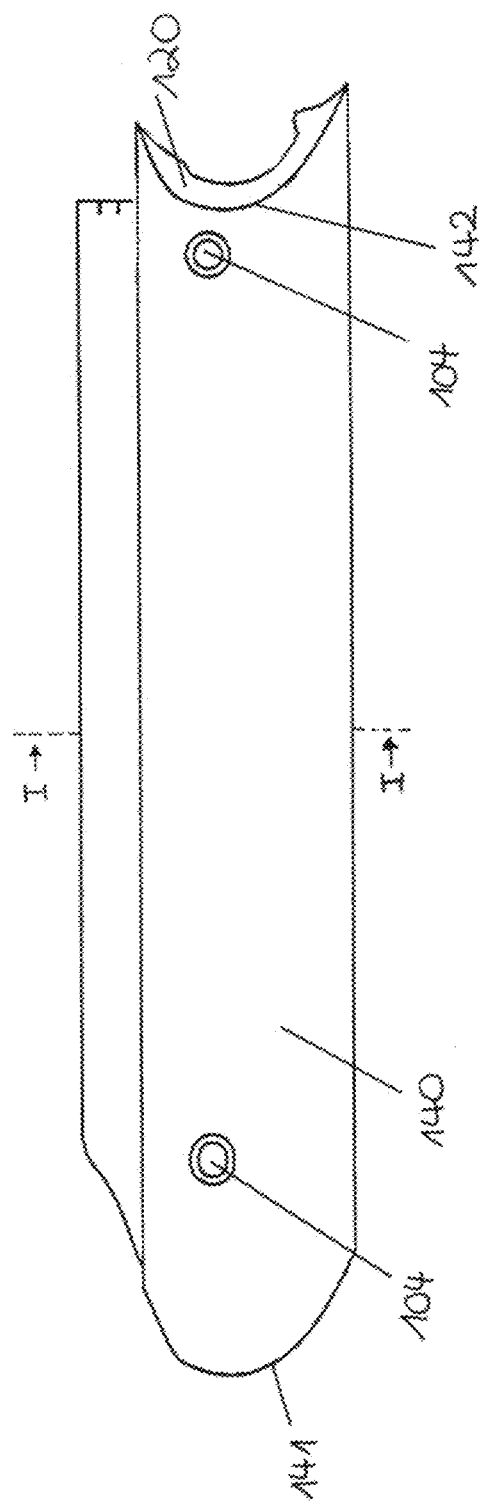
Figure 3D:
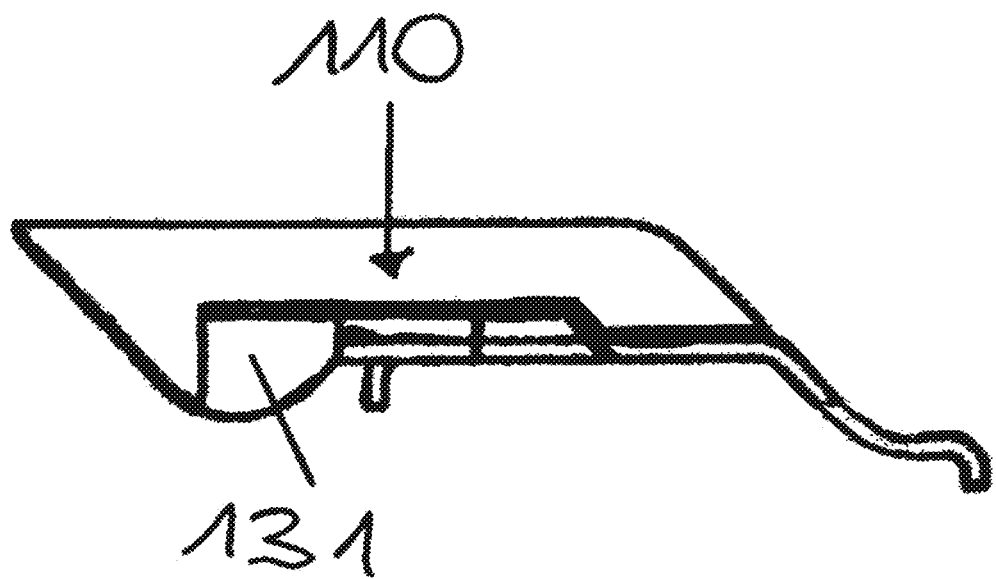
Figure 3E:
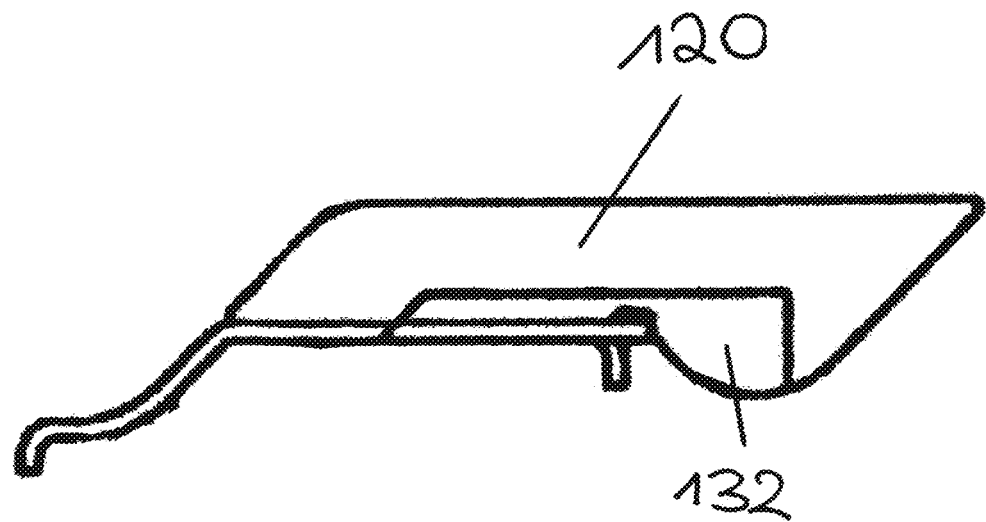
Figure 3F:
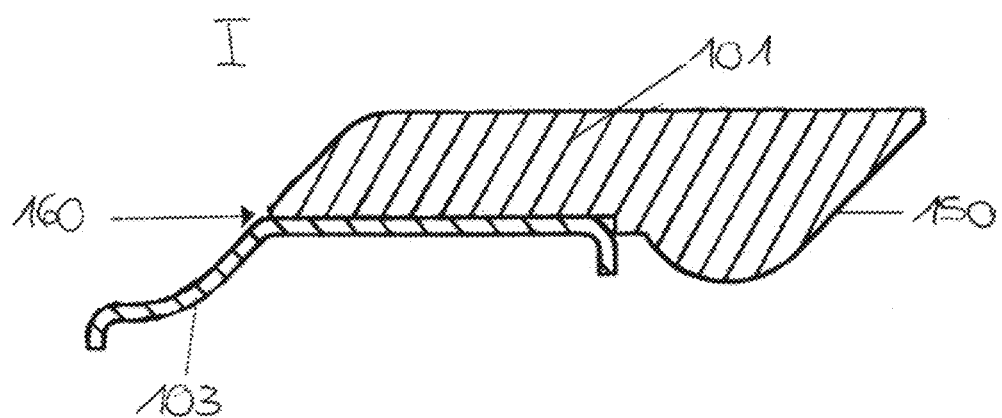

An example grate bar 100 is depicted in FIGS. 3a, 3b, 3c, 3d, e, and 3f in detail. These Figures include a bottom view in FIG. 3a, below is a side view in FIG. 3b, and further below is shown a top view in FIG. 3c. Front and rear views of FIGS. 3d and 3e are depicted at the respective sides of the side view of FIG. 3b. At the right of the top view is a cross sectional view (FIG. 3f) of plane I indicated in FIG. 3c. FIG. 3 (Overview) provides additional technical details.

The example grate bar 100 has an up-facing surface 140 configured for supporting bulk material like clinker, a lower facing surface 130 configured for supporting the grate bar 100 on the plank rests 200 as explained below, a front-end side 110, a rear-end side 120, a first (left) profiled narrow side 150 and a second (right) profiled narrow side 160, where the first (left) profiled narrow side 150 may preferably be spatially complementary to the second (right) profiled narrow side configured for forming a moving gap in between, if the first (left) profiled narrow side 150 of the grate bar 100 is positioned adjacent to the second (right) profiled narrow side 160 of a further grate bar 100.

The transition between the up-facing surface 140 and the front-end side 110 is preferably provided by a curved front edge 141. At the rear side of the up-facing surface 140 there is a rear edge 142 between the up-facing surface 140 and the rear-end side 120. Both edges 141 and 142 are preferably congruent and may describe a bow like curve. As depicted, the curve may be obtained by (a segment of) a line that is defined by the intersection of a circular cylinder surface with a plane, where the generating lines (and thus the cylinder axis) are inclined against (with respect to) the plane (that is defined by the up-facing surface 140) and its normal direction. In the depicted example, the generating lines are as well inclined against the longitudinal direction 2 (to be more precise: against a plane that is defined by the longitudinal direction 2 and the normal of the up-facing surface). The front side 110 and the rear side 120 may thus each comprise cylinder segments that are congruent to each other, which cylinder segments can be mapped onto each other by a simple translation in the longitudinal direction 2 (or the opposite direction).

The front and rear end surfaces 110 and 120 below the edges 141 and 142 may thus be inclined against (with respect to) the vertical and configured such that the front end surface 110 matches the rear end surface 120 if two identical grate bars 100 are arranged in a column as depicted in FIG. 1 thereby forming planks. If mounted, as depicted in FIG. 1 the front-end side 110 and the rear-end side 120 are in abutting relationship. If the grate bars elongate (due to thermal expansion), the front-end side 120 may slide and thereby so to speak "climb" over the rear-end side 120 of the consecutive grate bar 100.

As well the narrow profiled sides 150 and 160 preferably have congruent sections or are congruent, to form a moving gap 10 (see FIGS. 1a, 1b, and 2) in between, neighbouring grate bars if multiple planks are arranged as shown in FIGS. 1a, 1b, and 2. The congruent sections provide a moving gap with essentially constant thickness, thus the velocity of the coolant flowing through the gap remains essentially constant in the respective section.

Figure 4:
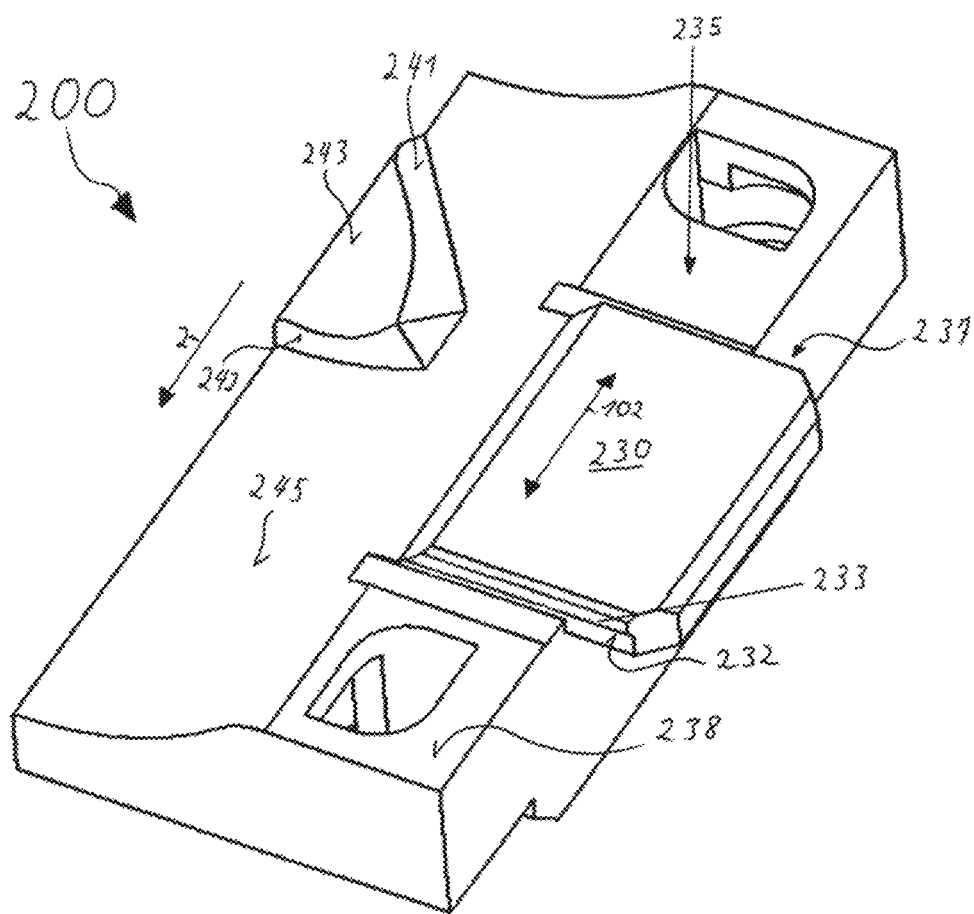
FIG. 4 shows a rest of a grate bar.

The bottom side of the grate bar 100 in FIG. 3a has two recesses 131 and 132, recess 131 which is in a front section 108 of the grate bar 100, and recess 132 which is in a rear section 109 of the grate bar 100. When mounted, these recesses 131, 132 engage with a spatially complementary protrusion of a plank rest (c.f. FIG. 4). The grate bar 100 has through holes 104 configured for bolting the grate bar 100 to the rest 200. The frontal through hole 104 is elongated to permit elongation of the grate bar 100 when it is heated. The diameter of both through holes 104 is stepwise reduced, to thereby enable to counterbore the bolt heads below the plane defined by the up-facing surface 140 of the grate bar 100. This protects the bolt heads from excessive wear and thus allows to open them for replacement or inspection of a grate bar 100.

An example grate bar rest 200, briefly referred to as rest 200, configured for mounting the grate bars 100 onto to the spreaders 40 is shown in FIG. 4. The rest 200 may be configured to support, in operation, a front-end section 108 of a first grate bar 100 and a rear end section 109 of a second grate bar 100. Thereby, consecutive grate bars 100 of a plank may be form-fittingly connected. The surface of the rest 200 is adapted to the down-facing surface 130 of the grate bars 100 and has a central protrusion 230, configured for engagement with said two recesses 131 and 132 in the down-facing side 130 of two consecutive (neighboring) grate bars 100. The engagement provides for precise positioning of the grate bars 100 on the spreaders 40 and permits to transmit the reciprocating movement from the longitudinal beams 20 via the spreaders 40 and rests 200 into the grate bars 100.

The rest 200 has a first up-facing surface 235 configured for supporting the upper part 101 of a front section 108 of a grate bar 100. In the example the first up-facing surface 235 is plane. In the first up-facing surface 235 is a recess configured for receiving a bolt for fixing the front section 108 of a grate bar 100 on the rest 200. Next to the first up-facing surface 235—in conveying direction 2—is the protrusion 230, which in this example resembles a cuboid. The right side (with respect to the conveying direction) of the cuboid is flattened. The frontal side 232 has a rim 233 that may engage with a grate bar 100 to reduce lifting forces when transmitting the force for reciprocating the grate bars 100.

The left side and the rear side 237 of the protrusion may be at least essentially plane and configured for positioning and guiding the grate bars 100 and may optionally be chamfered to enhance easy replacement of the grate bars 100. In conveying direction 2, next to the protrusion 230 may be a second up-facing surface 238 configured for supporting the rear section 109 of a consecutive (neighboring) grate bar 100. Like the first up-facing surface 235 the second up-facing surface 238 may be at least essentially plane and may have a recess for a bolt configured for fixing the rear section 109 of a grate bar 100 on the rest 200.

The right edges of the first up-facing surface 235, the second up-facing surface 238 and the protrusion 230 may be essentially aligned and preferably parallel to the conveying direction 2. Right of the respective line may be an inclined surface 245, preferably being curved to form fit with the down-facing surface 130 of the grate bars 100. In the rear half of the inclined surface 245 may be a further protrusion 240, with an up-facing surface 243 that is preferably similar, in the depicted example congruent, to a section of an up-facing surface of the right narrow profiled side 160. Thereby, if a grate bar 100 is mounted, the up-facing surface of the second (right) narrow profiled side 160 is continued by the up-facing surface 243 of the protrusion 240. The protrusion 240 has a rear-facing side 241 that may be complementary in curvature and inclination (that is, spatially complementary or reciprocal) to the respective section of the front-end side 110 of the grate bars 100. The front-facing side 242 of the protrusion 240 may accordingly be dimensioned to be complementary in curvature and slope (that is, spatially complementary) to the respective section of the rear-end side 120 of the grate bars 100.

The protrusion 240 enhances replacing of e.g. worn grate bars 100. When the grate bars 100 are mounted, the up-facing surface 243 of the protrusion 243 may be covered by the first (left) profiled narrow side 150 of a neighboured grate bar 100. Thus, the up-facing surface 243 is not subjected to abrasion due to transport of the clinker and does not need to be replaced.

Figure 5:
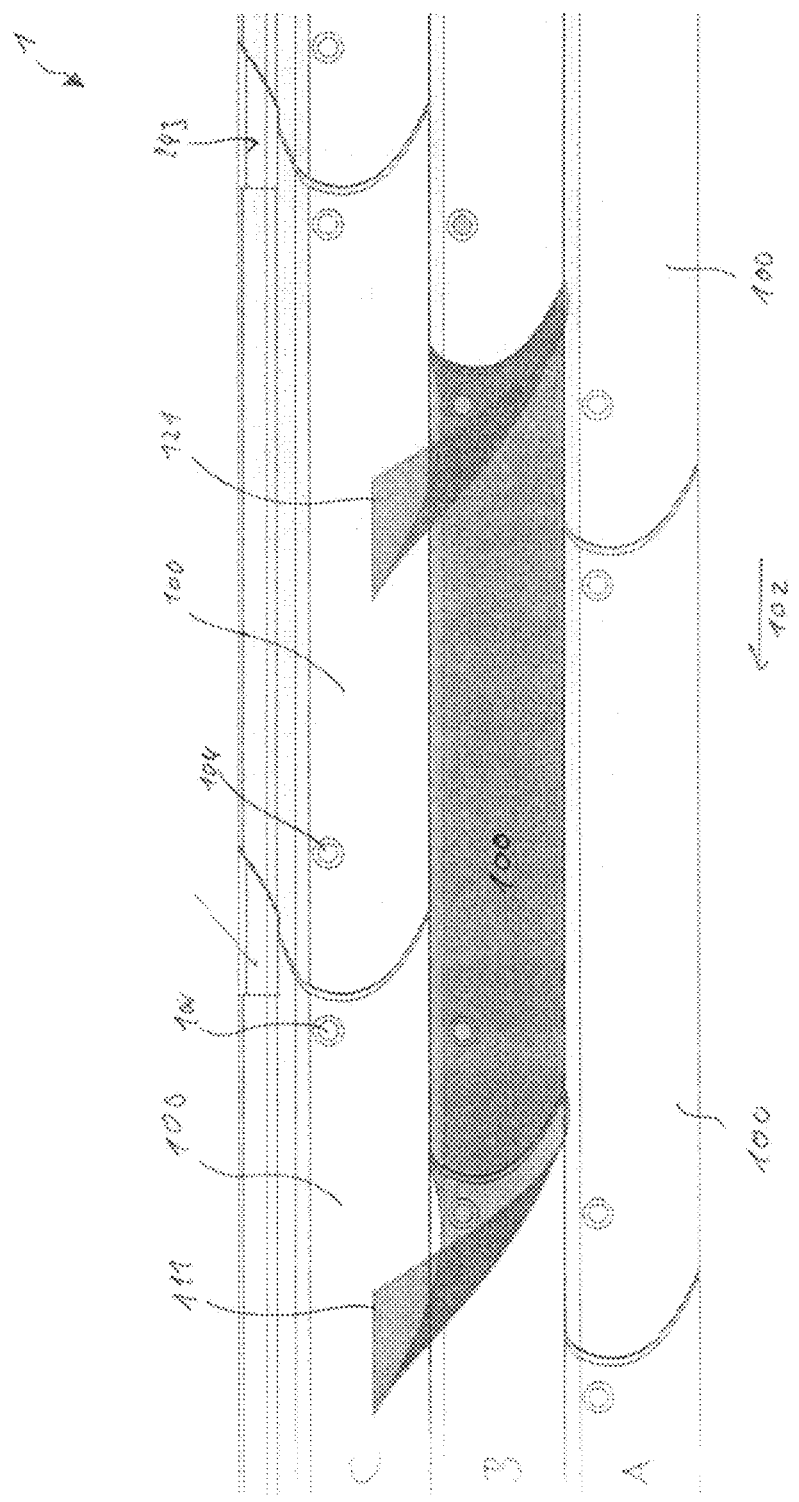
FIG. 5 illustrates a process of removal or insertion of a grate bar.
Figure 6:
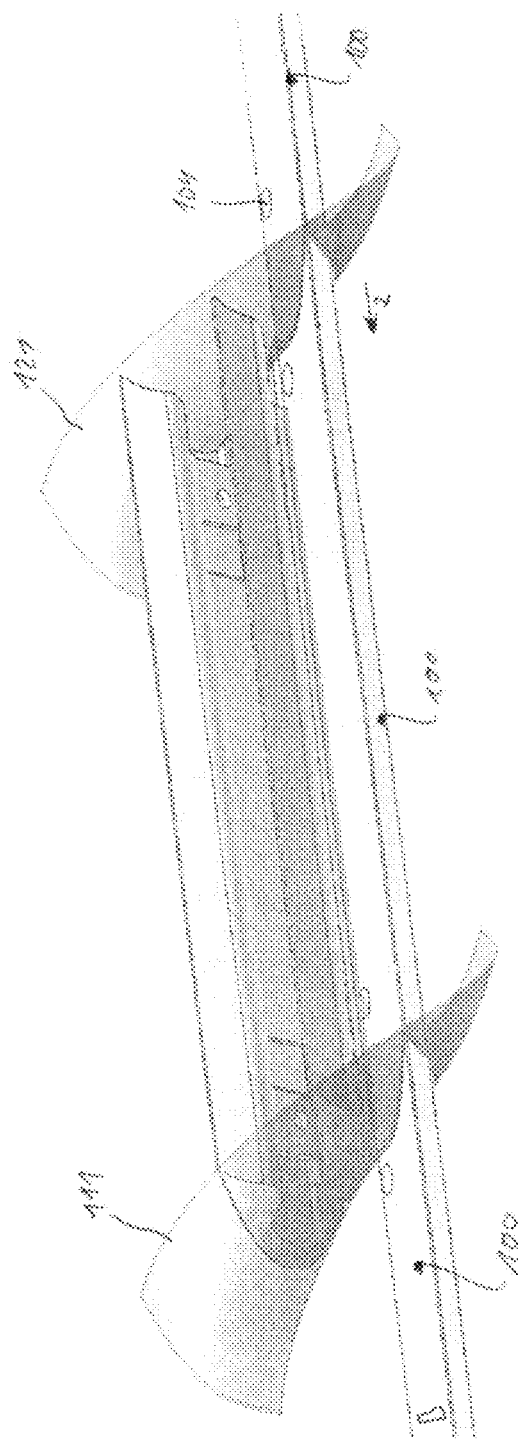
FIG. 6 shows removal or insertion of a grate bar.

A process of replacement of an example grate bar 100 is illustrated in FIG. 5 and FIG. 6. FIG. 5 is a top view on a detail of a parquet like grate floor 1. The detail shows three planks A, B, C of grate bars 100, which are mounted on longitudinal beams 20 via spreaders 40 and rests 200. Only the two up-facing surfaces 243 of the protrusion 240 of the rests 200 as shown in detail in FIG. 4 are visible, as the grate bars 100 that would cover the protrusions 240 have been omitted. The grate bar 100 can be removed out of the grate floor 1 by a movement of the grate bar 100 that is a superposition of a translation in the direction that is defined by the orientation of the generating lines of the cylinder surfaces of the front side 110 and the rear side 120 and a pivotal movement of said grate bar 100, as indicated by trajectories 111 and 121 of the front edge 141 and the rear edge 142. The same movement is depicted from a perspective view in FIG. 6.

Figure 7:
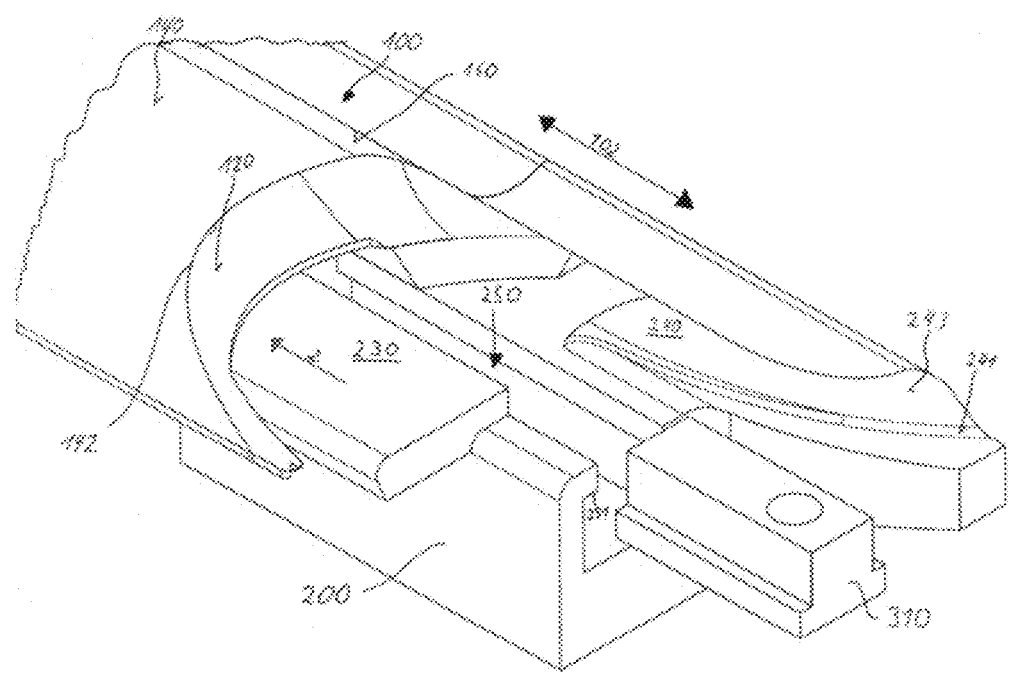
FIG. 7 shows a front section of a grate bar and a plank rest.
Figure 8:
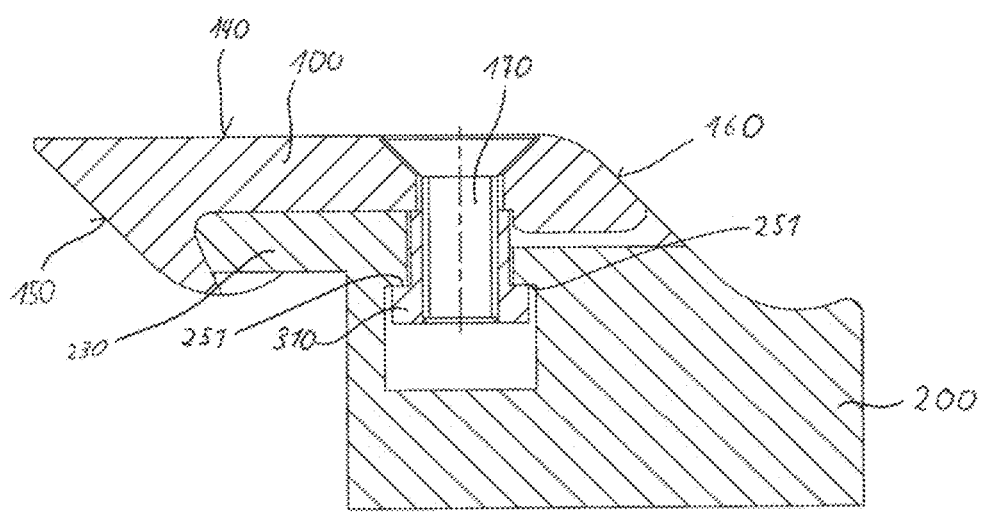
FIG. 8 is a cross section of the plank rest with an attached grate bar.

FIG. 7 shows a further example grate bar rest 200. The grate bar rest may be mounted like the rest 200 of in FIG. 4, on spreaders 40 as indicated in FIGS. 3a through 3f. The reference numerals as used in FIG. 3a-3f are used for similar or identical parts and details as well in FIGS. 7 and 8. In FIG. 7 the rear section of a grate bar 100 is shown, resting on a rest 200. The rest 200 may be attached to e.g. a spreader, for example as shown in FIG. 1 (Detail X) or FIG. 2. The rest 200 has a plateau like up-facing protrusion 230, configured for engagement with complementary recesses of the grate bars 100. The rest 200, in particular the protrusion 230 has a profiled slot 250 as guiding rail 250 for a keystone 310. The longitudinal direction of the guiding rail 250 is parallel to the conveying direction 2 and thus parallel to the reciprocating movement 102 of the non-fixed planks. The keystone is movable in the guiding rail 250. When attaching a rear section 109 of a grate bar 100 to the rest 200, the plank is bolted to the keystone. The keystone 310 is thereby lifted such that the rims of the keystone 310 are pushed against opposed rims 251 of the guiding rail (cf. FIG. 8). Thereby, the grate bars 100 are firmly attached to the rest 200 and the forces for the reciprocating movement can be transferred from the rest 200 to the grate bars 100, as shown in FIG. 8. As the keystone 310 is only pushed against the rim 251 of the guiding rail 250, it can still slightly translate in the guiding rail configured for compensation of thermal expansion and/or shrinking. In other words the torque for locking the bolt 170 may preferably be chosen to transmit the forces for driving the reciprocating movement of the grate bars 100 without play and at the same time allow a movement of the grate bars relative to the plank rest 200 due to thermal expansion and/or shrinkage.

In this application the terms horizontal and vertical have been used to indicate directions of faces of the grate bar. In this case it was assumed that the horizontal (and the horizontal line) is defined by the up-facing surface providing a support for the bulk material. The vertical (and the vertical line) is thus the normal of/to the up-facing surface. These assumed directions may in practice be different from the horizontal and vertical directions as defined with respect to the surface of the earth, but these assumptions simplify the presentation of the technical teaching and in particular its understanding.

It will be appreciated to those skilled in the art having the benefit of this disclosure that this invention is believed to provide a grate bar for a conveyor grate floor in particular of a cement clinker cooler and to a method for inserting or removing the grate bars into or from such grate floor, as well as such a grate floor. Further modifications and alternative embodiments of various aspects of the invention will be apparent to those skilled in the art in view of this description. Accordingly, this description is to be construed as illustrative only and is provided for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 1 grate floor
2 conveying direction
5 clinker inlet distribution system
10 moving gaps
20 longitudinal beam
21 profile
22 free end section of profile 21
30 side wall
40 spreader
100 plank/grate bar
101 upper part of grate bar 100, e.g. of cast metal
102 double headed arrow indicating direction of reciprocating movement of planks
103 baffle plate; e.g. of sheet metal
104 through hole for bolt with stepped reduction of diameter
108 front section
109 rear section
110 front-end side of grate bar/front surface
111 trajectory of front edge
120 rear-end side of grate bar/rear surface
121 trajectory of rear edge
130 down-facing surface
131 recess
132 recess
140 up-facing surface
141 curved front edge between up-facing surface and front-end side
142 rear edge between the up-facing surface and the rear-end side
150 first (e.g. left) profiled narrow side
160 second (e.g. right) profiled narrow side
170 bolt
200 grate bar rest/rest
230 protrusion for engaging with recesses 131, 132
232 front side of protrusion 230
233 rim
235 first up-facing side/surface of rest 200
237 rear side of protrusion 230
238 second up-facing side/surface of rest 200
240 guiding protrusion
241 rear-facing side of guiding protrusion
242 front-facing side guiding protrusion
243 up-facing surface of guiding protrusion
250 slot/guiding rail
251 rim of slot/guiding rail 250
310 keystone
A group denomination
B group denomination
C group denomination

The invention claimed is:

1. A grate bar configured to form a plank of a conveyor grate for transporting a bulk material by arranging a number of grate bars one in front of the other, the grate bar comprising:
an up-facing surface configured to support the bulk material,
a down-facing surface configured to support the grate bar on at least one grate bar rest,
a front-end side,
a rear-end side,
a first profiled narrow side and a second profiled narrow side that are complementary to one another and configured to form a moving gap between the first profiled narrow side and the second profiled narrow side if the first profiled narrow side of the grate bar is positioned adjacent to the second profiled narrow side of a neighboring grate bar, the neighboring grate bar being identical to said grate bar at least with respect to a profile of the second profiled narrow side,
wherein said gap is configured to enable a reciprocating movement of grate bars, which define said gap therebetween, along a direction parallel to the first profiled narrow side and the second profiled narrow side,
wherein:
each of the front-end side and the rear-end side comprises a surface that is a circular cylinder segment surface,
circular cylinder surfaces, which form bases for the circular cylinder segment surfaces of the front-end side and the rear-end side, have congruent directing curves;
a translation parallel to a longitudinal direction of the grate bar is sufficient to map the circular cylinder surface segment surface of the rear-end side onto the circular cylinder surface segment surface of the front-end side.

2. The grate bar of claim 1, wherein the front-end side and the rear-end side are inclined relative to a normal that is defined by the up-facing surface.

3. The grate bar of claim 1, wherein a front edge between the up-facing surface and the front-end side has a front edge curvature, and wherein a rear edge between the up-facing surface and the rear-end side has a rear edge curvature, and wherein the rear edge curvature is complementary to the front edge curvature.

4. The grate bar of claim 1, wherein one of the first and second profiled narrow sides has an up-facing section that is inclined with respect to a normal drawn to the up-facing surface of the grate bar, and wherein the transition between the up-facing section of the one of the first and second profiled narrow side and the up-facing surface of the grate bar is continuously curved.

5. The grate bar of claim 1, further comprising a baffle plate attached to the bottom side of the grate bar.

6. The grate bar of claim 5, wherein the baffle plate extends a lower end of the up-facing section of the profiled narrow side.

7. A grate floor for cooling and conveying bulk material, the grate floor comprising multiple grate bars,
wherein the multiple grate bars are mounted in columns on a supporting structure to thereby form planks with a moving gap between the grate bars to provide a cooling gas via the moving gap,
wherein the supporting structure comprises at least two groups of longitudinal beams,
wherein the longitudinal beams of each of the at least two groups are connected by spreaders spanning over longitudinal beams of the respective other of the at least two groups,
wherein a grate bar, from the multiple grate bars, is configured to form a plank of a conveyor grate for transporting said bulk material by arranging multiple of such grate bars one in front of the other and comprises:
an up-facing surface configured to support the bulk material,
a down-facing surface configured to support the grate bar on at least one grate bar rest,
a front-end side,
a rear-end side,
a first profiled narrow side and a second profiled narrow side that are complementary to one another and configured to form a moving gap between the first profiled narrow side and the second profiled narrow side if the first profiled narrow side of the grate bar is positioned adjacent to the second profiled narrow side of a neighboring grate bar, the neighboring grate bar being identical to said grate bar at least with respect to a profile of the second profiled narrow side,
wherein each of the front-end side and the rear-end side comprises a surface that is a cylinder segment surface,
wherein cylinder surfaces, which form bases for cylinder segment surfaces of the front-end side and the rear-end side, have congruent directing curves, and
wherein a translation parallel to a longitudinal direction of the grate bar is sufficient to map the cylinder surface segment of the rear-end side onto the cylinder surface segment of the front-end side.

8. The grate floor of claim 7, wherein at least one of said spreaders supports a number of grate bar rests, wherein a grate bar rest from said grate bar rests is configured to support at least one grate bar.

9. The grate floor of claim 8, wherein at least one of said grate bar rests supports two consecutive grate bars in a column of consecutive grate bars.

10. The grate floor of claim 8, wherein the at least one of said number of said grate bar rests has at least one guiding protrusion with an up-facing surface of said at least one guiding protrusion forming a boundary of said moving gap.

11. The grate floor of one of claim 7, wherein a front-end side of at least one rear grate bar in a column of consecutive grate bars abuts form-fittingly a rear-end side of another grate bar of said consecutive grate bars.

12. The grate floor of claim 7, wherein at least one grate bar rest comprises at least one protrusion engaging in a recess of a first of consecutive grate bars and in a recess of a subsequent second of said consecutive grate bars.

13. A clinker cooler with the grate floor of claim 7, wherein longitudinal beams in at least one group of the longitudinal beams are driven to reciprocate and wherein one other group of the longitudinal beams is static.

14. A method for mounting or unmounting a grate bar to a grate floor, the grate bar being configured to form a plank of a conveyor grate for transporting a bulk material by arranging a number of grate bars one in front of another, wherein the grate bar comprises:
an up-facing surface configured to support the bulk material,
a down-facing surface configured to support the grate bar on at least one grate bar rest,
a front-end side,
a rear-end side,
a first profiled narrow side and a second profiled narrow side that are complementary to one another and configured to form a moving gap between the first profiled narrow side and the second profiled narrow side if the first profiled narrow side of the grate bar is positioned adjacent to the second profiled narrow side of a neighboring grate bar, the neighboring grate bar being identical to said grate bar at least with respect to a profile of the second profiled narrow side,
wherein:
each of the front-end side and the rear-end side comprises a surface that is a cylinder segment surface, and
cylinder surfaces, which form bases for cylinder segment surfaces of the front-end side and the rear-end side, have congruent directing curves;
the method comprising:
inserting or removing the grate bar into or from, respectively, the grate floor, wherein said inserting or removing comprises a movement of the grate bar, which movement is a superposition of a translation along an axis and a rotation about said axis being parallel to a longitudinal direction of the grate bar,
wherein said translation parallel to the longitudinal direction of the grate bar is sufficient to map the cylinder surface segment of the rear-end side onto the cylinder surface segment of the front-end side.

* * * * *